United States Patent [19]

Shipley et al.

[11] Patent Number: 4,915,494
[45] Date of Patent: Apr. 10, 1990

[54] CARBON-CARBON MIRROR FOR SPACE APPLICATIONS

[75] Inventors: John W. Shipley; Robert F. Monks; Gary L. Corey, all of Palm Bay, Fla.

[73] Assignee: Harris Corporation, Melbourne, Fla.

[21] Appl. No.: 215,512

[22] Filed: Jul. 6, 1988

[51] Int. Cl.⁴ ............................ G02B 5/08; G02B 7/18
[52] U.S. Cl. ...................................... 350/641; 350/609
[58] Field of Search ............... 350/641, 642, 609, 607; 428/408, 457, 687, 668, 672, 680, 912.2

[56] References Cited

U.S. PATENT DOCUMENTS

| | | | |
|---|---|---|---|
| 2,123,049 | 7/1938 | Irby | 350/641 |
| 2,397,583 | 4/1946 | Wise et al. | 350/641 |
| 2,976,890 | 3/1961 | Barnes et al. | 350/641 |
| 3,497,377 | 2/1970 | Allingham | 350/641 |
| 3,841,737 | 10/1974 | Rambauske et al. | 350/641 |
| 3,880,500 | 4/1975 | Kojabashian | 350/608 |
| 4,093,349 | 6/1978 | Mills | 350/641 |
| 4,256,378 | 3/1981 | Prewo et al. | 350/641 |
| 4,357,286 | 11/1982 | Stalcup et al. | 350/641 |
| 4,422,725 | 12/1983 | Prewo | 350/607 |
| 4,444,467 | 4/1984 | Skuskus et al. | 350/607 |
| 4,451,118 | 5/1984 | Stalcup et al. | 350/607 |
| 4,451,119 | 5/1984 | Meyers et al. | 350/609 |
| 4,643,518 | 2/1987 | Taniguchi | 350/641 |
| 4,772,111 | 9/1988 | Shimura et al. | 350/609 |
| 4,791,076 | 12/1988 | Leggett et al. | 350/609 |

FOREIGN PATENT DOCUMENTS 169102 10/1983 Japan ........................... 350/641

Primary Examiner—Jon W. Henry
Attorney, Agent, or Firm—Antonelli, Terry & Wands

[57] ABSTRACT

A carbon-carbon mirror for high thermal input space applications is comprised of a plurality of thermally conductive, metallic layers formed as a laminate structure atop a carbon-carbon substrate. Within the laminate structure, a first thin adhesion layer of chromium is formed directly on the surface of a carbon-carbon substrate. Atop the adhesion layer, a plating base layer of gold or copper is deposited, followed by a thick working/smnoothing layer of nickel, which serves as the optically reflective surface of the mirror. The nickel layer is polished to a precision flatness or smoothness. Because the underlying gold and chromium layers possess high thermal conductivity, they enhance the transmission of heat from the cladding layer to the underlying carbon-carbon substrate, thereby preventing the laminate from absorbing heat, which would lead to delamination of the structure. In order to minimize thermally induced distortion of the mirror structure, the metal laminate build-up is preferably formed on opposite sides of the carbon-carbon substrate, thereby affording a thermal balancing of the substrate. However, the nickel layer on the non-reflective side of the mirror is not polished.

15 Claims, 1 Drawing Sheet

CARBON-CARBON MIRROR FOR SPACE APPLICATIONS

FIELD OF THE INVENTION

The present invention relates in general to mirrors suitable for high thermal energy applications, such as solar energy concentrators and laser mirrors, and is particularly directed to a metallic laminate mirror structure having a carbon-carbon substrate.

BACKGROUND OF THE INVENTION

Mirrors designed for use in space and airborne high thermal energy applications (e.g. solar concentrators and laser mirrors) must not only be lightweight (to satisfy payload launch requirements), but must possess a high precision optical smoothness and flatness that is dimensionally stable over a wide range of thermal inputs.

For this purpose, the use of lightweight composites, particularly glass laminate structures employing a carbon-carbon substrate, has been proposed. One example of such a glass laminate-on-carbon-carbon mirror structure is detailed in U.S. Pat. No. 4,451,119 to Meyers et al. As described therein, because of its strength, low weight and thermal stability properties, a carbon-carbon substrate offers a particularly attractive substrate or backing material for supporting a reflective surface. However, because of its porosity and generally rough fibrous surface, a carbon-carbon substrate offers a surface of poor optical quality upon which to form a highly reflective coating. Consequently, the patentees propose the use of an intermediate bonding laminate structure of silicon carbide and glass that serves to fill in the voids in the carbon-carbon substrate and provides an adhesion layer that can be polished to optical quality for receiving a reflective coating. Unfortunately, such a structure suffers from a number of drawbacks that the use of a carbon-carbon substrate seeks to overcome.

More specifically, the choice of a carbon-carbon substrate is predicated upon its thermal stability (low coefficient of thermal expansion) and its substantial load-bearing to weight capacity. These performance advantages are diminished in the patented mirror structure because of the interposition of the glass laminate between the carbon-carbon substrate and the optical cladding layer. The glass laminate adds substantial mass, on the one hand and, most significantly, constitutes a thermal insulating barrier between the optical cladding layer and its underlying carbon-carbon support substrate. As a result, the high thermal inputs with which the mirror is intended to be used cause a substantial heating of the glass laminate structure and eventually lead to a delamination of the intermediate adhesion layers, thus effectively warping and degrading the reflective surface.

SUMMARY OF THE INVENTION

Pursuant to the present invention, the above-mentioned drawbacks of conventional carbon-carbon mirror structures, such as the glass-containing laminate design described in the Patent to Meyers et al, are obviated by a new and improved carbon-carbon mirror configuration which, rather than absorb and be distorted by high thermal inputs to the mirror, provides instead a heat removal flow path between the optical coating and the underlying carbon-carbon substrate, so that the integrity and fidelity of the mirror surface is not detrimentally affected. For this purpose, the mirror structure according to the present invention is comprised of a plurality of thermally conductive, metallic layers formed as a laminate structure atop the carbon-carbon substrate.

In accordance with a preferred embodiment of the invention, within the laminate structure, a first thin (on the order of 50 Angstroms thickness) adhesion layer of chromium or similar Group VIA, VIIA or VIIIA metal is formed directly on the surface of a carbon-carbon substrate and effectively replicates the rough fibrous texture of the surface of the carbon-carbon substrate. Atop this adhesion layer a plating base layer of gold or copper or similar Group VIIIA or IB metal (having a thickness on the order of 2000 Angstroms) is deposited, followed by a thick working/smoothing layer of nickel or similar Group VIA, VIIA, VIIIA or IB (thickness on the order of 0.001–0.003 inch.) which is to serve as the optically smooth surface of the mirror on which a reflective metal such as aluminum, silver or rhodium may be deposited. The nickel layer is polished to a precision smoothness (40 Angstroms, peak-to-peak). Because the underlying gold and chromium layers possess high thermal conductivity, they augment, rather than effectively impede, (as occurs in the case of the thermally insulating glass of a conventional carbon-carbon mirror structure described in the above-referenced Meyers et al patent) the transmission of heat from the cladding layer to the underlying carbon-carbon substrate.

In order to minimize thermally induced distortion of the mirror structure, the metal laminate build-up is preferably formed on opposite surfaces of an individual carbon-carbon substrate, thereby affording a thermal balancing of the substrate. However, the nickel layer on the non-reflective side of the mirror is not polished, to avoid unnecessary processing.

DETAILED DESCRIPTION

Figure 1:
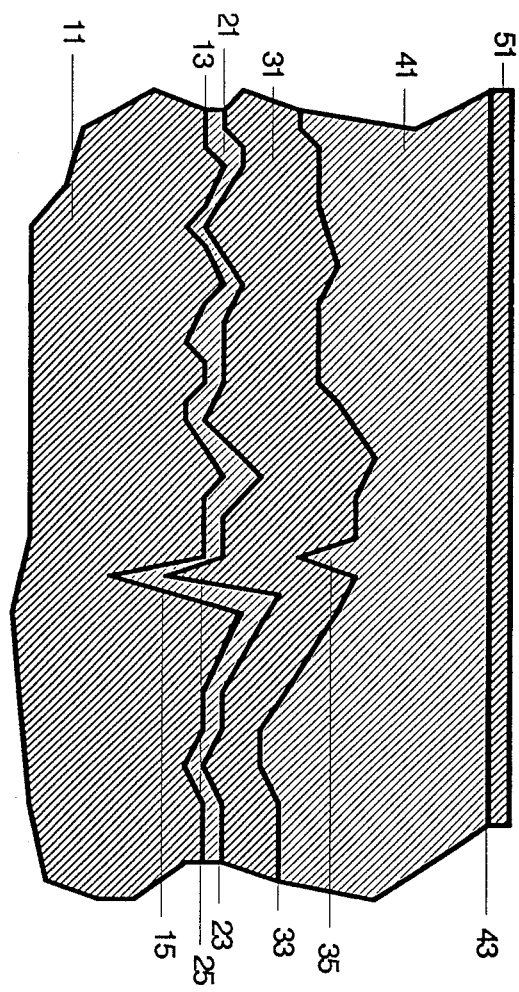
FIG. 1 is a cross-sectional illustration of a metallic laminate structure for a mirror built up on a substrate of carbon-carbon material in accordance with the present invention.

Referring now to FIG. 1, there is illustrated a cross-sectional illustration of a metallic laminate structure for a mirror built up on a substrate of carbon-carbon material in accordance with the present invention. The carbon-carbon substrate, shown at 11, may comprise a commercially available carbon-carbon material, such as that described in the above-referenced Meyers et al patent, and may have a thickness on the order of 0.045 inches. Using a surface characteristic measurement device, such as an Alpha step profilometer measurement device, the roughness of the top surface 13 of the substrate 11 was observed to be on the order of 2.0–2.5 $\mu$m with peaks (valleys) 15 of up to 5.4 $\mu$m. Using conventional polishing equipment, such as a Strasbaugh Model Y-1 polisher, the top surface 13 of substrate 11 was ground and polished on a six inch steel lap with 5 $\mu$m microgrit, thereby reducing the roughness to an average on the order of 1.0–1.5 $\mu$m with peaks on the order of 2.0–3.5 $\mu$m.

Following this grinding of surface 13 of the carbon-carbon substrate 11, a thin adhesion layer of chromium 21 was deposited on the polished surface 13. For this purpose, a VEECO VE-7760 high vacuum deposition system was employed to form a thin layer of chromium having thickness on the order of 50 Å–500 Å. As noted above, chromium layer 21 serves to adhere overlying metal (gold/nickel) to the underlying carbon-carbon substrate.

As can be seen in FIG. 1, because of the thinness of the adhesion layer 21, its top surface 23 effectively replicates the roughness of the surface 13 of the underlying carbon-carbon substrate 11. FIG. 1 illustrates a valley 25 of chromium layer 21 aligned with valley 15 of carbon-carbon substrate 11.

Next, a gold layer 31 was vapor deposited on the chromium layer 21 to a thickness on the order of 2,000 Å–2,500 Å. As can be seen from FIG. 1, the texture of the top surface 33 of the gold layer 31 effectively replicates that of the underlying chromium layer 21 and carbon-carbon substrate 11, so that a valley 35 of the gold layer 31 is effectively aligned with the valley 15 in the underlying carbon-carbon substrate. Gold layer 31 provides a plating base for a thick nickel layer 41 which is to serve as the optically smooth surface of the mirror. In place of gold layer 31, copper or similar Group VIIIA or IB metal may be used as a plate base for the nickel layer. In this case vapor deposition is again used to deposit 2,000 Å–2,500 Å of metal on the chromium, adhesion layer 21.

In order to form the nickel layer 41, a nickel sulfamate solution was electrolessly plated on the gold base layer using the following procedure.

With the gold layer 31 deposited on the chromium adhesion layer 21, the metal laminate was electrolytically cleaned in a isopropylene cleaning solution having a volume density of 58.6 ounces per gallon in a temperature range of 70°–75° C. for a period of 10–30 seconds and then rinsed in water. Next, the structure was immersed in a 10–15% solution of sulfuric acid for 20–30 seconds and then again rinsed in water. This cleaning procedure may be repeated as desired to assure cleanliness of the surface of the gold layer 31.

Following the cleaning of the surface of the gold layer 31, the laminate structure was subjected to a strike in NL electroless nickel 63 at a temperature of 75°–80° C., with four parts of NL electroless nickel 63 mixed with one part of water, with the electroless strike taking place for a period of 10–20 seconds. After an initial deposit, the structure remained emerged in the nickel strike for a period of 30 minutes to improve the resistance for sulfamate nickel.

Next, nickel sulfamate was plated upon the strike layer at a temperature of 45°–50° C., via filter system agitation, at plating rate of 0.001 mils per hour (25 amps/FT$^2$) for a period of 3 hours. The resulting nickel layer 41 plated up to a thickness on the order of 0.001–0.003".

Following this nickel plating step, top surface 43 of the nickel layer 41 was ground to remove edge build-up and the roughness was measured. Initial surface roughness averaged about 0.6 μm with peaks of 1.2–1.8 μm. This roughness was reduced by grinding surface 43 using 5 μm grit paper to improve the roughness to an average of about 0.4 μm with a peak roughness of 0.8–1.0 μm.

Following this initial roughness reduction step, surface 43 was polished with a 3 μm diamond buff, to result in an extremely smooth precision surface 43, the surface roughness of which was measured to be about 30–40 Å with peaks of only 60 Å, thereby providing an extremely high quality optical surface. Following this, an optically reflective layer 51 such as aluminum, silver or rhodium may be deposited on the substrate to provide maximum reflectivity.

Because the optical quality layer 41 and underlying laminate structure through which the optical quality layer 41 is attached to the carbon-carbon substrate 11 is comprised of a series of contiguous highly conductive metal layers (chromium-gold-nickel) there is effectively provided a high thermal conductivity path between the optical quality surface 43 upon which optically reflective layer 51 that receives the high thermal energy inputs and the underlying carbon-carbon substrate 11, which not only provides the high stiffness to weight ratio for minimizing the weight of the mirror structure for required structural rigidity, but enjoys high thermal conductivity. The carbon-carbon substrate also possesses a low coefficient of thermal expansion, thereby minimizing thermal distortion in the surface of the mirror in response to thermal fluctuations in the environment to which the mirror is exposed. Consequently, the thermal energy of an intense optical input to the reflective surface of the mirror is rapidly conducted away through the metal laminate structure and into the underlying carbon-carbon substrate.

This thermal transmission effect of the present invention offers a substantial advantage over conventional glass laminate structures, such as that described in the above-reference Meyer et al patent, which glass structures effectively constitute thermal insulators, that block or impede the transmission of thermal energy between the mirror surface and the underlying carbon-carbon substrate. As a consequence, in a conventional glass-containing laminate structure, the substantial thermal energy inputs (which can reach temperatures on the order of 4,000° F.) can cause a delamination and cracking of the laminate build-up, thereby warping the mirror and destroying its precision geometry.

Because of the superior performance characteristics of the present invention, it has particular utility in space-spaced applications, such as solar concentrator mirror configurations. One example of the application of the present application to such a solar concentrator structure involves its use in a faceted mirror architecture, such as that described in copending application Ser. No. 019,699 filed Feb. 27, 1987, entitled "Offset Truss Hex Solar Concentrator" by J. White et al, and assigned to the assignee of the present application. When employed for the individual triangle facets of the mirror structure described in that application, the processing of the laminate structure of the mirror structures is carried out after the tiles are individually formed and mounted. Then, the above-described sequence of steps is carried out, with each tile being measured with precise flatness measuring equipment to verify its flatness.

Following their individual manufacture, the tiles are placed on precision ground glass plate having small holes through its thickness to provide a vacuum drawing source. The tiles are aligned on a plate in a pattern designed for the final facet. A vacuum is then applied to the glass plate, so that the tiles are held in place and an underlying graphite-base structure is bonded to individual tile standoffs using a graphite-base ceramic adhesive. The vacuum provided during the attachment of the tiles provides a strain relief during bounding so that the tiles will not move out of place during the cure cycle.

It should be observed that the metallic laminate, carbon-carbon structure of the high thermal energy mirror structure of the present invention is not limited to use in only the solar energy concentrator structure described in the above-referenced copending patent application. That application is simply mentioned as an example of the application of the invention and a suitable environment in which individual mirror tiles may be fabricated and employed.

Figure 2:
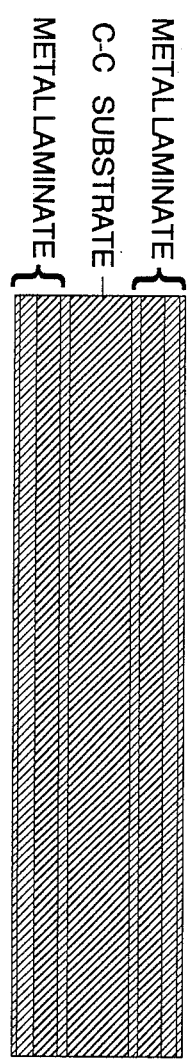
FIG. 2 diagrammatically shows a metal laminate mirror structure build-up formed on each of opposite surfaces of a carbon-carbon substrate.

As noted previously, in order to minimize thermally induced distortion of the mirror structure, the metal laminate build-up is preferably formed on each of opposite surfaces of the carbon-carbon substrate, as diagrammatically illustrated in FIG. 2, thereby affording a thermal balancing of both sides of the substrate. However, the nickel layer on the non-reflective side of the mirror is not polished, to avoid unnecessary processing.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A mirror for high thermal energy applications comprising:
   a carbon-carbon substrate;
   a high reflectivity optical coating; and
   material of high thermal conductivity adhering said high reflectivity optical coating to said carbon-carbon substrate, said high thermal conductivity adhering material comprising an adhesion layer on the order of 50–500 angstroms in thickness formed on said carbon-carbon substrate, and a plating base layer having a thickness on the order of 2000–2500 angstroms formed on said adhesion layer, said high reflectivity optical coating being plated on said plating base layer; and wherein
   the total thickness of said high reflectivity optical coating and said adhering material is on the order of 1–3 mils.

2. A mirror according to claim 1, wherein said high thermal conductivity adhering material comprises a metallic layer.

3. A mirror according to claim 2, wherein said metallic layer is comprised of metal of Groups VIA, VIIA and VIIIA of the periodic table.

4. A mirror according to claim 3, wherein said highly reflective optical coating comprises a metal cladding layer having an optical reflective surface.

5. A mirror according to claim 4, wherein said metal cladding layer comprises a multilayer metal laminate.

6. A mirror according to claim 5, wherein said multilayer metal laminate is comprised of a plurality of metallic layers containing at least one metal selected from Groups VIA, VIIA, VIIIA and IB of the periodic table.

7. A mirror according to claim 1, wherein said high reflectivity optical coating comprises a cladding layer of high thermal conductivity.

8. A mirror for high thermal energy applications comprising:
   carbon-carbon substrate on which is supported in thermal communication therewith a thermally conductive optical coating of high reflectivity, and wherein said thermally conductive optical coating comprises a metallic cladding layer having an optically reflective surface, and said mirror includes metallic adhesion means providing a thermal transmission medium for facilitating heat transfer between said metallic cladding layer and said carbon-carbon substrate, said metallic adhesion means comprising an adhesion layer on the order of 50–500 angstroms in thickness formed on said carbon-carbon substrate, and a plating base layer having a thickness on the order 2000–2500 angstroms formed on said adhesion layer, said metallic cladding layer being plated on said plating base layer, and wherein the total thickness of said metallic cladding layer and said metallic adhesion means is on the order of 1–3 mils.

9. A mirror for high thermal energy applications comprising:
   a carbon-carbon substrate; and
   a highly reflective optical coating bonded to said substrate by a thermally transmissive bonding material, said thermally transmissive bonding material comprising an adhesion layer on the order of 50–500 angstroms in thickness formed on said carbon-carbon substrate, and a plating base layer having a thickness on the order of 2000–2500 angstroms formed on said adhesion layer, said highly reflective optical coating being plated on said plating base layer; and wherein
   the total thickness of said high reflectivity optical coating and said thermally transmissive bonding material is on the order of 1–3 mils.

10. A mirror according to claim 9, wherein each of said highly reflective optical coating and said thermally transmissive bonding material is made of metal.

11. A mirror for high thermal energy applications comprising:
   a carbon-carbon substrate having first and second opposite surfaces substantially parallel with one another;
   a first layer of a first thermally conductive material of high reflectivity adhered to said first surface of said carbon-carbon substrate by a second layer of a second thermally conductive material therebetween; and
   a third layer of said first thermally conductive material adhered to said second surface of said carbon-carbon substrate by a fourth layer of said second thermally conductive material therebetween; and wherein
   each of said second and fourth layers of thermally conductive material comprises an adhesion layer on the order of 50–500 angstroms in thickness formed on said carbon-carbon substrate, and a plating base layer having a thickness on the order of 2000–2500 angstroms formed on said adhesion layer, said first and second layers being plated on respective plating base layers of said second and fourth layers, respectively, the total thickness of said first and second layers and the total thickness of said third and fourth layers being on the order of 1–3 mils.

12. A mirror according to claim 11, wherein each of said first and third layers comprises a metallic cladding layer.

13. A mirror according to claim 12, wherein said metallic cladding layer comprises a multilayer metallic laminate structure.

14. A mirror for high thermal energy applications comprising:

a carbon-carbon substrate and a thermally conductive, high reflectivity metallic cladding layer in continuous thermal communication with said carbon-carbon substrate by means of a thermally conductive adhesion layer contiguous with each of said carbon-carbon substrate and said metallic cladding layer, said thermally conductive adhesion layer comprising an adhesion layer on the order of 50–500 angstroms in thickness formed on said carbon-carbon substrate, and a plating base layer having a thickness on the order of 2000–2500 angstroms formed on said adhesion layer, said high reflectivity metallic cladding layer being plated on said plating base layer; and wherein the total thickness of said high reflectivity metallic cladding layer and said thermally conductive adhesion layer is on the order of 1–3 mils.

15. A mirror for high thermal energy applications comprising a carbon-carbon substrate having a thickness on the order of 45 mils, a plating adhesion metal layer of high thermal conductivity formed on said carbon-carbon substrate, said plating adhesion metal layer comprising an adhesion layer on the order of 50–500 angstroms in thickness formed on said carbon-carbon substrate, and a plating base layer having a thickness on the order of 2000–2500 angstroms formed on said adhesion layer, and a high reflectivity metallic layer plated on said plating base layer to a thickness on the order of 1–3 mils.

* * * * *